United States Patent [19]

Hombrecher

[11] Patent Number: 4,940,178

[45] Date of Patent: Jul. 10, 1990

[54] SOLDERING IRON

[75] Inventor: Fritz Hombrecher, Bad Wertheim, Fed. Rep. of Germany

[73] Assignee: ERSA Sachs KG GmbH & Co., Wertheim, Fed. Rep. of Germany

[21] Appl. No.: 383,191

[22] Filed: Jul. 20, 1989

[30] Foreign Application Priority Data

Jul. 21, 1988 [DE] Fed. Rep. of Germany ....... 3825048

[51] Int. Cl.$^5$ ........................... B23K 3/02; B23K 3/03
[52] U.S. Cl. ....................................... 228/55; 228/51; 219/238
[58] Field of Search ............... 228/51, 55; 219/227, 219/229, 230, 238

[56] References Cited

U.S. PATENT DOCUMENTS

| 249,229 | 11/1881 | Doyle | 228/55 |
| 1,656,256 | 1/1928 | Wilson | 219/238 |
| 4,641,010 | 2/1987 | Abura et al. | 219/230 |

FOREIGN PATENT DOCUMENTS 2913384 11/1979 Fed. Rep. of Germany ........ 228/55
3610042 12/1986 Fed. Rep. of Germany ........ 228/55

Primary Examiner—Nicholas P. Godici
Assistant Examiner—Samuel M. Heinrich
Attorney, Agent, or Firm—McGlew & Tuttle

[57] ABSTRACT

A soldering iron comprises a tube and a soldering tip slipped onto the front or outer end of the tube with a close sliding fit. The soldering tip is fastened axially by means of a spring element which is fastened to an inner end of the tube. In order to secure the soldering tip from rotating, the diameter of the front or outer section of the tube is made smaller than the diameter of the far or inner end section of the tube and the soldering tip is connected form-fittingly with the tube by a web formed in the inner tube which engages in a slot of the outer tube.

9 Claims, 1 Drawing Sheet

SOLDERING IRON

BACKGROUND OF THE INVENTION

1. Field of the Invention

The invention relates, in general, to soldering and, in particular, to a new and useful soldering iron having a covering tube and a soldering tip slipped onto a front section of the tube in a close sliding fit, the soldering tip being fastened axially by means of a spring element which is fastened at the far end section of the tube.

Soldering irons are known from German patents DE No. 29 13 384 C1 and DE No. 36 10 042 C1. In such a soldering iron the soldering tip, which is slipped onto the tube receiving the heating element in a close sliding fit, is retained in axial directions by means of a spring element usually in the form of a tensioning spring. The point of the tube having a detector is pressed against the bottom of the inner bore of the soldering tip, but the soldering tip can rotate with regard to the tube by a certain angle determined by the length of the front end of the spring wire end engaging with the soldering tip. One end of the tension spring is fastened on the tube by means of several spring windings and a tight fit. Herein it is a disadvantage that the soldering tip can rotate on the tube, so that the actual work section of the soldering tip can rotate away from the desired soldering position. Furthermore, the known soldering tip fastenings for thin-walled hollow soldering tips with diameters of less than 3 mm can be employed only with limitations.

SUMMARY AND OBJECTS OF THE INVENTION

The invention provides a soldering iron having a soldering tip fastened to a tube and the soldering tip is fastened with a thin-walled hollow soldering tip.

According to the invention, the diameter of the front section of the tube is smaller than the diameter of the opposite rear end section of the tube and the soldering tip is connected form-fittingly with the tube in the area of a step formed between the different diameters. Herein, the formation of the step between the front and rear sections of the tube having different diameters, permits connection of the soldering tip form-fittingly with the tube, so that in addition to axially fastening the soldering tip to the tube by means of the spring element the soldering tip is also fastened rotation-free on the tube containing the heating element. Due to this the fastening means of the soldering tip can also be used for thin-walled hollow soldering tips with a diameter of less than 3 mm.

The particular advantages to be achieved with the rotation-free soldering tip fastening means according to the invention are in particular that bent soldering tips can no longer rotate on the tube due to the lever arm created by the bending of the soldering tips and regardless of whether the bare heating element does or does not have a detector, it can no longer be damaged by inexpert handling, in particular by rotating the soldering tip; and thin-walled hollow soldering tips with an outer diameter of 2.5 to 3 mm can be held rotation-free.

A formation of a hook on the soldering tip is advantageous. The slot formed at the free end of the soldering tip for the formation of the hook interacts with a web formed in the area of the step. The outer radius of the web is smaller or equal to the outer radius of the far end section of the tube having the larger diameter. Herein the inner bore of the soldering tip advantageously has a plus-tolerance of 0.1 mm, as the soldering tip can be held securely by means of a tension spring. The soldering tips can be exchanged quickly and easily when hot. The plus-tolerance of the inner bore prevents a baking of the soldering tip to the inner bore. During the process of manufacturing the hook on the free end of the soldering tip and, in particular, in a peeling process the groove and the slot for the reception of the web being used to secure the soldering tip against rotation is made at the same time.

Accordingly, it is an object of the invention to provide a soldering iron which includes an inner tube having at least one inner and one outer portion which are interconnected and with a soldering strip which is slipped onto the tube with a close sliding fit, the soldering tube being held against rotation by a spring which has a lower portion that is coiled around the inner portion of the tube and an outer end which engages with the soldering tube and holds it against rotation. The tube outer portion is made of a smaller diameter than its inner portion and it is formed fittingly engaged with the soldering tip by interengageable web and recessor slot portions of these two parts.

A further object of the invention is to provide a soldering device which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE INVENTION

Figure 1:
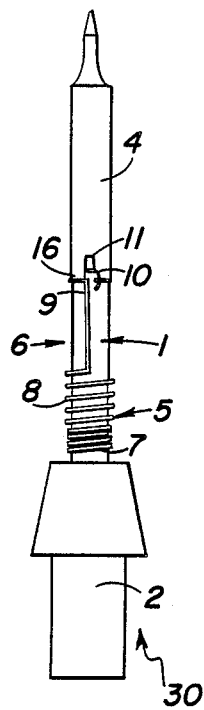
FIG. 1 is a side elevational view of an upper portion of a soldering iron having a tube with the tube carrier and a slip-on soldering tip, which is held by a tensioning spring and constructed in accordance with the invention.
Figure 3:
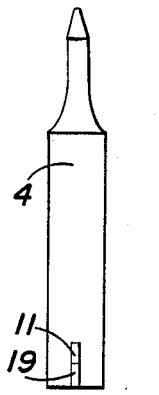
FIG. 3 is an enlarged side elevational view of the soldering tip in the position according to FIG. 1

Referring to the drawings, in particular, the invention embodied therein comprises a soldering iron generally designated 30 which includes an inner tube generally designated 1 arranged over a tube carrier 2. The inner tube includes at least one inner section 12 and one outer section 13. In addition, a soldering tip 4 is slipped onto the tube 1 with a close sliding fit. A spring 5 generally has an inner coiled portion 7 which is tightly secured around the tube inner portion 12 and has an outer end engaged with the soldering tip 4. The soldering tip 4 is fastened axially and against rotation by the spring 5. The diameter 20 of the tube outer portion is smaller than the diameter 20 of the tube inner portion. Soldering tip 4 is connected form-fittingly with the tube 1 by a wet portion to provide a tube upper surface which engages in a recess or slot portion of the other.

The tube 1 of a soldering iron generally designated 30 is attached to the soldering iron handle by means of a tube carrier 2. A front or upper end section 3 of the tube 1 carries a soldering tip 4, which is fastened to the tube 1 by means of a tensioning spring or fastening element 5.

Herein, according to German DE No. 29 13 384 the tensioning spring 5 has a coil section or portion 7 in a lower or rear end section 6 of the tube I positioned or held by a tight fit. The spring 5 has a further coil section 8 which is movable with regard to the upper end 3 of the tube 1 and which passes over into an upper spring wire end 9, ending in a hook 10. The hook 10 engages with a hook 11 on the soldering tip 4 for an axial fastening of the soldering tip 4.

The tube 1 comprises two tube sections or portions 12 and 13. The tube section 13 fits in the tube portion or section 12 with a close sitting fit, and the two are connected to one another by means of spot welding. On its inside the upper tube section 13 carries a bare heating element 14 with a detector 15 at the free face end. The length of the part of the front or upper tube section 13 freely protruding from the lower tube section 12 and the length of the heating element 14 freely protruding from the front upper section 13 are dimensioned so that the free lower edge 16 of the soldering tip 4 mounted with a sliding fit does not go all the way down to the step 17 formed by the difference in diameters 20 and 21 of the respective upper and lower end section 3 and 6 of the tube 1 in order to achieve a secure contact between the soldering tip 4 and the detector 15. The inner bore of the soldering tip 4 is cut free correspondingly.

In the area of the step 17 a web 18 protrudes axially and forward from the far end section 6 of the tube 1 over the upper section 13 of the tube 1, the web 18 being dimensioned so that its outer surface lies within the diameter 21 of the far or inner end section 6 of the tube 1, i.e. the web 18 does not protrude over the outer contour of the far end section. Thus the lower coil section 7 of the tensioning spring 5 can be led freely over the front or upper section 3 of the tube 1 and over the web 18 and then be rotatingly slipped onto the far or lower end section 6 of the tube 1. A close sliding fit exists between the lower coil section 7 of the tensioning spring 5 and the lower end section 6 of the tube 1.

Figure 4:
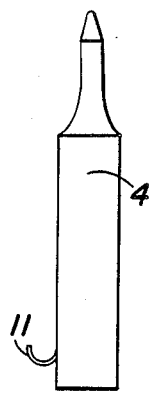
FIG. 4 is an enlarged side elevational view of the soldering tip according to FIG. 3 in a position rotated around the longitudinal axis by 90°.
Figure 2:
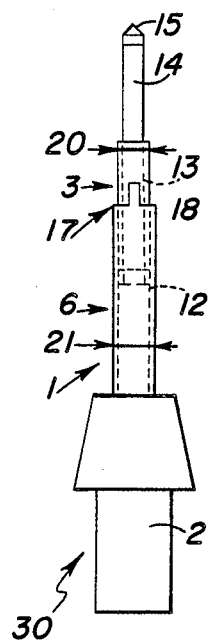
FIG. 2 is a view similar to FIG. 1 of the tube without the soldering tip but with a tube carrier and heater.

The soldering tip 4 has a slot 19 at its free or lower edge 16 which runs parallel to the tip's axis. By means of a peeling process the material of the slot 19 is turned outward to form a hook 11, as shown in FIG. 4. The slot 19 has e.g. a width of 1.0 to 1.5 mm. When the soldering tip 4 is slipped on, this is regularly done once the tensioning spring 5 is twisted onto the tube 1, the web 18 of the far or inner end section 6 of the tube 1 engages with the slot 19 of the soldering tip 4, the width of the web 18 being a little smaller than the width of the slot 19. Thus the sliding fit between the soldering tip 4 and the tube 1 with regard to the front section 3 of the tube 1 is created, the soldering tip 4 with its inner end of the inner bore pushes against the heating element 14 and also the detector 15, and the web 18 is retained in the slot 19. By hooking the hook 10 of the tensioning spring 5 into the hook 11 of the soldering tip 4, the soldering tip 4 which is held secured against rotation and is also secured axially.

The soldering tip 4 advantageously has a slot 19 and a hook on respective opposite sides, so that the soldering tip 4 only has to be rotated by 180° when one-sided wear occurs and it can be used again immediately.

Furthermore, the tube 1 with its two tube sections 12, 13 can also be formed in one piece, herein the far or outer end section 6 of the tube 1 is widened or the front or outer section 3 of the tube 1 is tapered. In either case the web 18 is formed at the same time.

While specific embodiments of the invention have been shown and described in detail to illustrate the application of the principles of the invention, it will be understood that the invention may be embodied otherwise without departing from such principles.

What is claimed is:

1. A soldering iron, comprising: a tube member having a front section and a rear section, the diameter of said front section being smaller than the diameter of said rear section; a soldering tip positioned on said front section of said tube, said tip including a rear edge; a spring element positioned about said rear section of said tube and fixed at said rear section by a spring element winding portion which closely fits said rear section, said spring element including a front end engaging a hook portion of said soldering tip for fixing said tip axially with respect to said tube; and rotation preventing means connected to said tube and connected to said soldering tip rear edge at said tip rear edge, at a step formed at a top front surface of said tube, adjacent said front section and connected to said soldering tip rear edge said portion preventing means including a tip engaging surface defined at said step and a tube engaging surface defined at said rear edge of said soldering tip for a positive non-rotational locking between said tube and said tip.

2. A soldering iron according to claim 1, wherein said tube is formed of one piece with said step provided between an inner portion and an outer portion, said step being formed by widening said tube inner portion with the outer portion of said tube being tapered toward its end.

3. A soldering iron according to claim 1, wherein said tube is formed of two sections which are engaged one in the other in a close sliding fit and connected in a fixed manner.

4. A soldering iron according to claim 3, wherein said tube portions are spot-welded together.

5. A soldering iron according to claim 1, wherein said tube includes an inner portion and an outer portion forming said step therebetween with said inner portion being of a larger diameter than said outer portion, said soldering tip having a slot in its lower edge and with the smaller diameter portion of said tube having a web portion fitting into said slot.

6. A soldering iron according to claim 5, wherein the material of the slot is bent outwardly to form a hook and to form said slot, said spring element having a hook end engaged with said hook.

7. A soldering iron according to claim 1, wherein said soldering tip includes an inner edge having a slot in its circumference and having a portion of the wall forming said slot bent into a hook-shaped configuration engageable with said spring.

8. A soldering iron, comprising: a tubular portion including a front section and a rear section, said front section having a diameter which is smaller than the diameter of said rear section, a step portion formed adjacent said front section defining a tube upper surface; a soldering tip positioned on the front section of said tube portion, said soldering tip including a free rear edge; a spring element pushed over said rear section of said tube portion including a winding part closely fitting about said rear section for fixing said spring element axially, said spring element including a front end engaging a hook on said tip for fixing said tip axially; and, rotation preventing means provided on said tube top front surface and provided on said tip free rear edge for non-rotational positive locking between said tube and said tip.

9. A soldering iron according to claim 8, wherein said front section is hollow for receiving a sensor, said soldering tip defining a hollow portion surrounding said sensor and tube front section.

* * * * *